United States Patent Office.

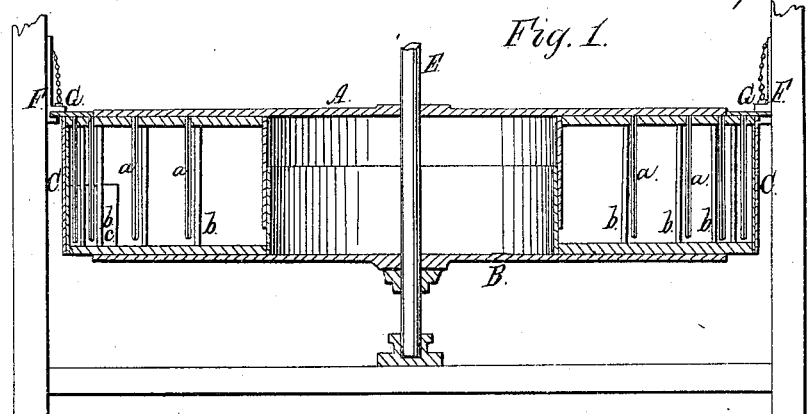
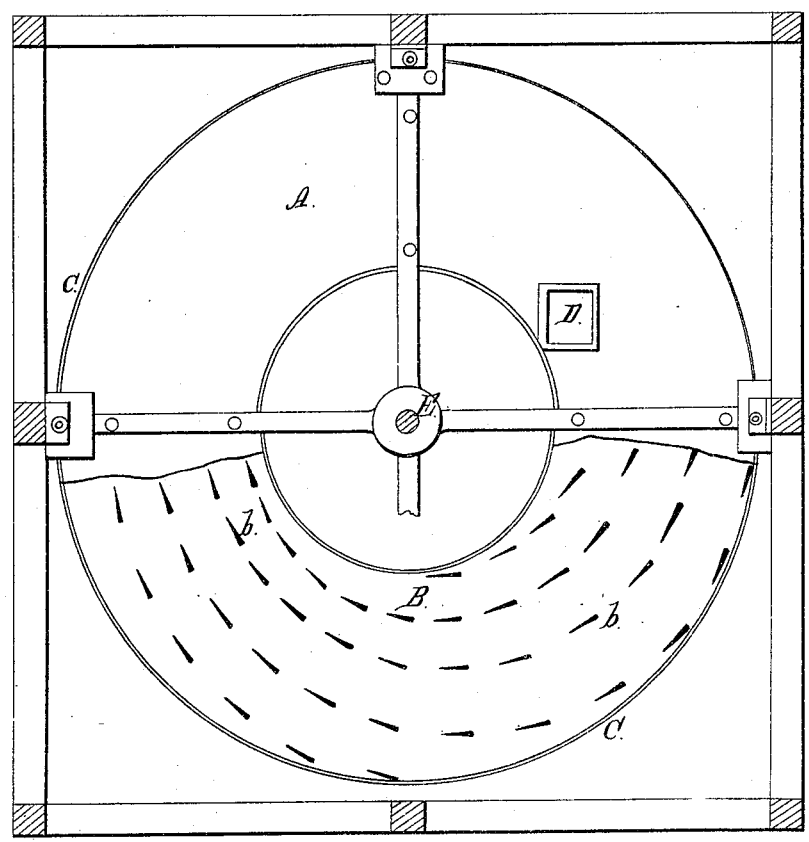

W. N. GRAVES, OF ST. LOUIS, MISSOURI, ASSIGNOR TO HIMSELF AND E. C. STERLING, OF SAME PLACE.

Letters Patent No. 92,040, dated June 29, 1869.

IMPROVED MACHINE FOR PREPARING CLAY FOR BRICK-MAKING.

The Schedule referred to in these Letters Patent and making part of the same.

*To all whom it may concern:*

Be it known that I, W. N. GRAVES, of St. Louis, in the county of St. Louis, and State of Missouri, have made certain new and useful Improvements in Picking-Machine for Preparing Clay for Making Bricks; and I do hereby declare that the following is a full and clear description thereof, reference being had to the accompanying drawings and to the letters of reference marked thereon.

The object of this invention is to pick up the clay as it comes from the pug-mill, and make it more fleecy, and better prepared for entering the moulds, than it could be if passed directly from the mill to the moulds.

To enable those skilled in the art to make and use my improved machine, I will proceed to describe its construction and operation.

Figure 1 of the drawings is a sectional plan of the improved machine.

Figure 2 is a plan of the same, with a portion of the covering-disk removed.

The operative parts of the machine consist of an upper stationary disk A and a lower revolving disk, B, an annular rim, C, being fixed to the periphery of the upper disk, so as to depend therefrom, and form a housing which encloses the entire space between the two disks.

The contiguous faces of the disks are studded with teeth *a b*, which are affixed to the said disks, in curved lines, diverging from the centre outwardly, so that when the machine is revolved, the clay, which is fed in through the spout D, will, by the centrifugal action of the machine, be expelled outwardly, and escape through the aperture *c* in the side of the housing or rim C.

The teeth *a b* are formed like blades, sharp on one edge, so as to cut the clay through which they pass, and the length of them is just sufficient to fill the distance between the two disks A B.

The rotating disk may be operated by the driving-shaft E and the usual gearing.

The disk A is supported upon brackets F and bolts G, passing through the disk, said brackets holding the disk in position. In case of accident or clogging of the material between the disks A and B, the operator withdraws the bolts G, and moves the disk A out from under the upper bracket F, and then raises the disk A off, to inspect the interior.

I do not claim broadly the employment of disks provided with teeth, for this I know to be old; but Having described my invention,

What I claim, is—

The disk A, when supported by notches F and bolts G, and arranged as described, for the purpose set forth.

W. N. GRAVES.

Witnesses:
 GEO. P. HERTHEL, Jr.,
 WM. W. HERTHEL.